United States Patent [19]

Coyne et al.

[11] Patent Number: 5,136,751

[45] Date of Patent: Aug. 11, 1992

[54] WHEEL ASSEMBLY

[75] Inventors: Patrick J. Coyne, Shaker Heights; Paul E. Brokaw, Euclid, both of Ohio

[73] Assignee: Master Manufacturing Co., Cleveland, Ohio

[21] Appl. No.: 693,688

[22] Filed: Apr. 30, 1991

[51] Int. Cl.⁵ .............................................. B60B 30/00
[52] U.S. Cl. .......................................... 16/29; 16/30; 16/31 R; 16/40
[58] Field of Search ................ 16/29, 30, 31 R, 31 A, 16/40, 45

[56] References Cited

U.S. PATENT DOCUMENTS

| | | |
|---|---|---|
| Re. 31,110 | 12/1982 | Black . |
| 568,535 | 9/1896 | Isidor ........................ 16/40 |
| 835,492 | 11/1906 | Baker ........................ 16/31 R |
| 2,175,317 | 10/1939 | Rogers ........................ 16/29 |
| 2,478,563 | 9/1949 | Book ........................ 16/40 |
| 3,557,401 | 1/1971 | Jenkins . |
| 3,570,041 | 3/1971 | Closa . |
| 3,577,620 | 5/1971 | Hoffman . |
| 3,675,269 | 7/1972 | Closa . |
| 3,744,083 | 7/1973 | Jenkins . |
| 3,818,541 | 6/1974 | Daniels . |
| 3,858,271 | 1/1975 | Howard et al. . |
| 3,869,105 | 3/1975 | Daniels . |
| 3,893,700 | 7/1975 | Dunmyer . |
| 3,922,754 | 12/1975 | Anderson . |
| 3,928,888 | 12/1975 | Lapham . |
| 3,935,613 | 2/1976 | Kaneko . |
| 3,977,040 | 8/1976 | Sugasawara . |
| 4,026,570 | 5/1977 | Feinberg . |
| 4,054,965 | 10/1977 | Uig et al. . |
| 4,068,342 | 1/1978 | Carrier . |
| 4,069,543 | 1/1978 | James . |
| 4,086,680 | 5/1978 | Kelly . |
| 4,092,031 | 5/1978 | Greer et al. . |
| 4,102,556 | 7/1978 | Webb . |
| 4,107,817 | 8/1978 | Sloan et al. . |
| 4,129,921 | 12/1978 | Greene . |
| 4,161,803 | 7/1979 | Propst et al. . |
| 4,196,493 | 4/1980 | Propst et al. . |
| 4,262,871 | 4/1981 | Kolk et al. . |
| 4,316,305 | 2/1982 | Seaford . |
| 4,327,460 | 5/1982 | Wolff . |
| 4,332,052 | 6/1982 | Remington . |
| 4,339,842 | 7/1982 | Fontana et al. . |
| 4,409,715 | 10/1983 | Timmer . |
| 4,457,045 | 7/1984 | Kegg . |
| 4,530,543 | 7/1985 | Keane . |
| 4,550,808 | 11/1985 | Folson . |
| 4,554,704 | 11/1985 | Raffaeli . |

(List continued on next page.)

FOREIGN PATENT DOCUMENTS

| | | | |
|---|---|---|---|
| 3102533 | 10/1982 | Fed. Rep. of Germany .......... | 16/45 |
| 2230694 | 10/1990 | United Kingdom .................... | 16/45 |

Primary Examiner—David Jones
Attorney, Agent, or Firm—Calfee, Halter & Griswold

[57] ABSTRACT

A wheel assembly designed to be adhesively attached to an article. The assembly includes a mounting plate having an upper surface with an adhesive layer and a peel-away protective cover. The cover is designed to be removed to reveal the underlying adhesive layer. The mounting plate further includes a center portion and side portions which are pivotal relative to each other to enable the mounting plate to be adhesively attached to adjacent surfaces of the article. A pair of legs are formed in one piece with the mounting plate and extend away from the bottom surface. Each of the legs has a front edge and a rear edge. The front and rear edges of the legs are inwardly offset from the front and rear edges of the mounting plate to prevent the mounting plate from separating from the article. The pair of legs and the bottom surface of the mounting plate between the legs define a wheel channel. A relatively rigid insert is located within and conforms substantially to the wheel channel. A wheel is rotatably supported on an axle at least partially within the channel to provide support and mobility for the article.

36 Claims, 4 Drawing Sheets

U.S. PATENT DOCUMENTS

| | | |
|---|---|---|
| 4,570,288 | 2/1986 | Kassai . |
| 4,624,028 | 11/1986 | Wilkes . |
| 4,669,580 | 6/1987 | Neville . |
| 4,679,670 | 7/1987 | Wickman . |
| 4,707,881 | 11/1987 | Van Hoye . |
| 4,719,663 | 1/1988 | Termini . |
| 4,719,664 | 1/1988 | Berfield . |
| 4,731,900 | 3/1988 | Frobose . |
| 4,731,901 | 3/1988 | Daniels . |
| 4,735,459 | 4/1988 | Massonnet . |
| 4,749,159 | 6/1988 | Hoff ............ 16/29 |
| 4,752,986 | 6/1988 | Rivkin et al. . |
| 4,777,697 | 10/1988 | Bernot . |
| 4,783,880 | 11/1988 | Chapman et al. . |
| 4,788,741 | 12/1988 | Hilborn . |
| 4,793,022 | 12/1988 | Raffaeli . |
| 4,807,328 | 2/1989 | Hezel . |
| 4,839,938 | 6/1989 | Coggin et al. . |
| 4,887,824 | 12/1989 | Zatlin . |
| 4,953,257 | 9/1990 | Seynhaeve . |

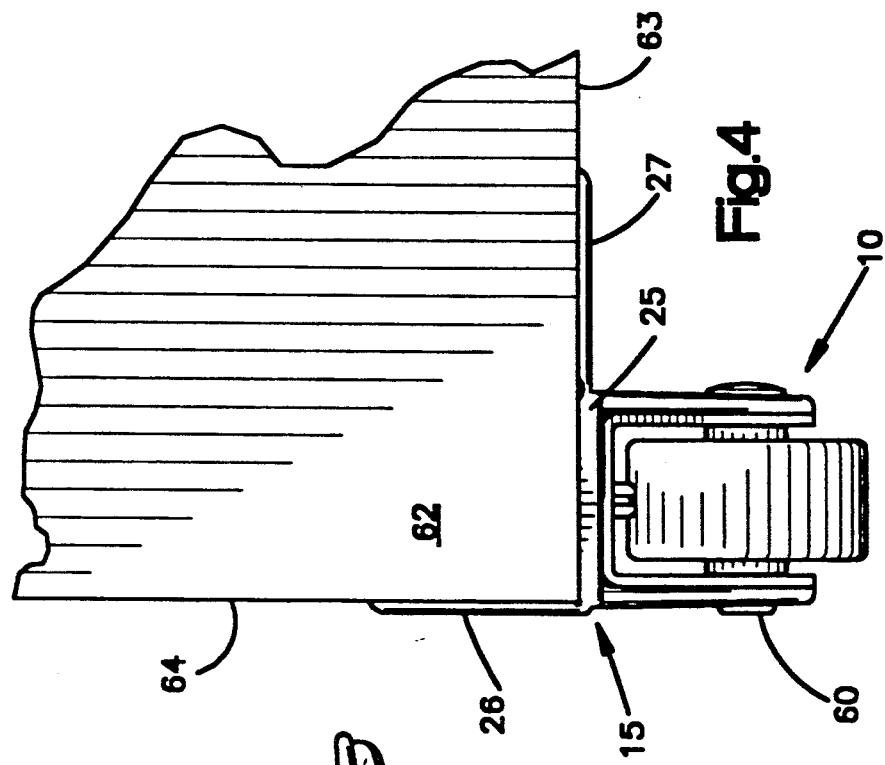
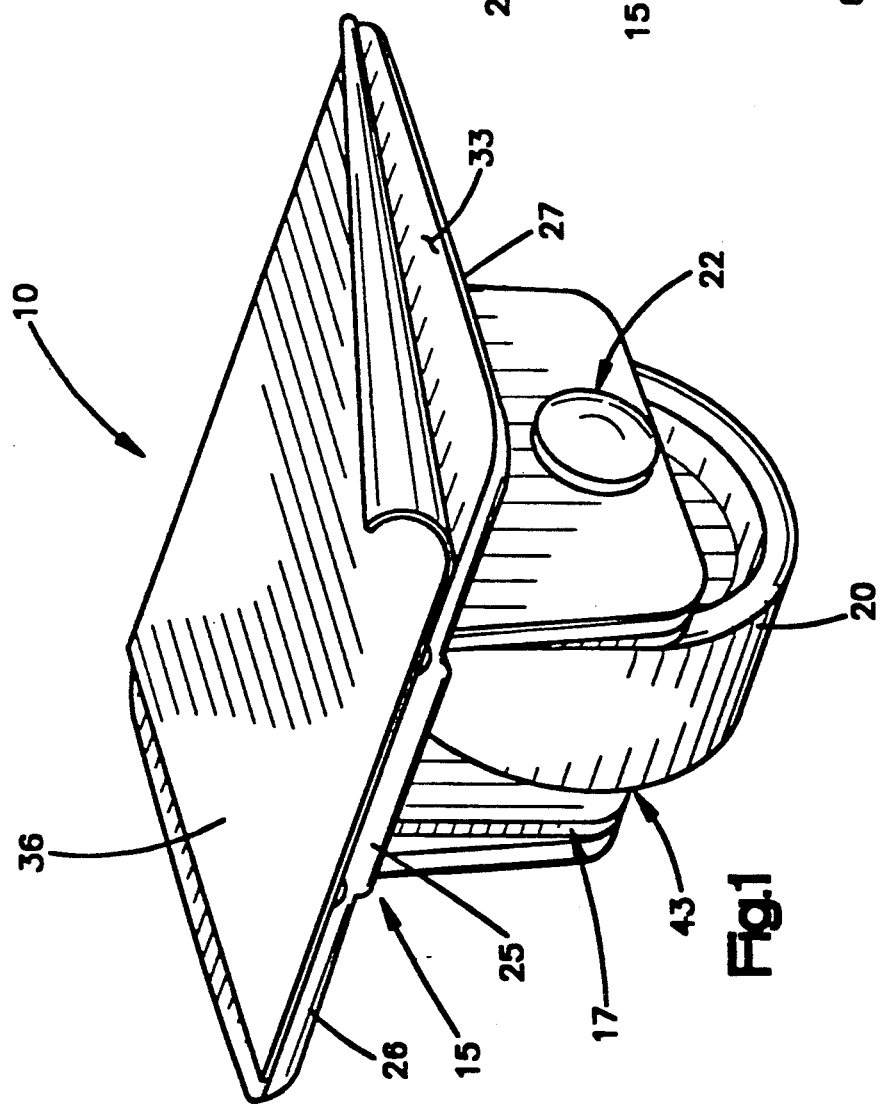

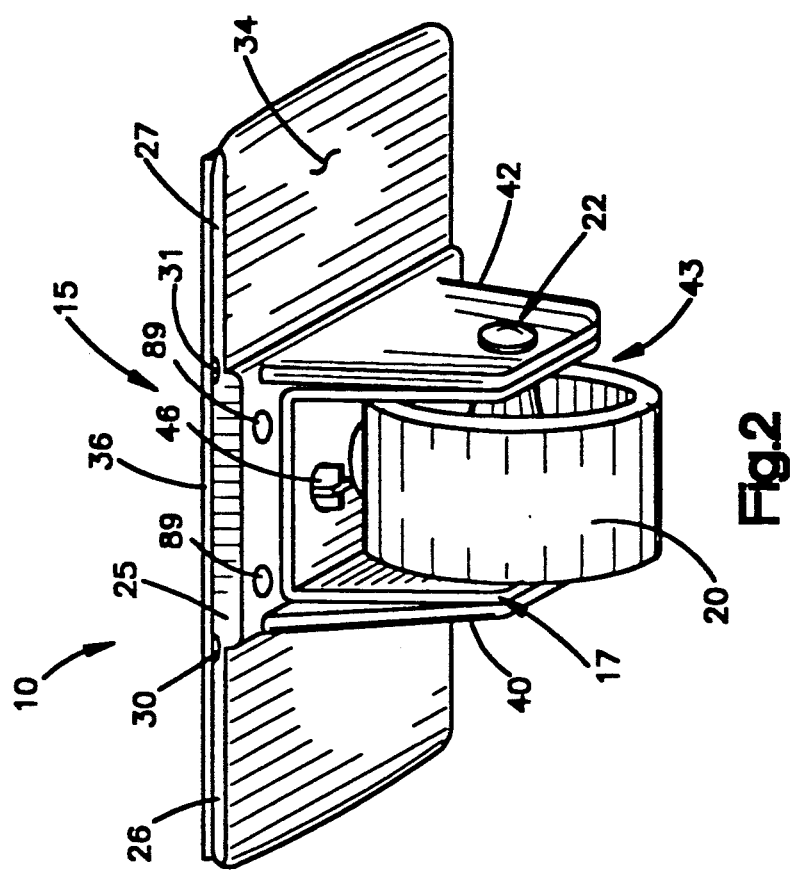
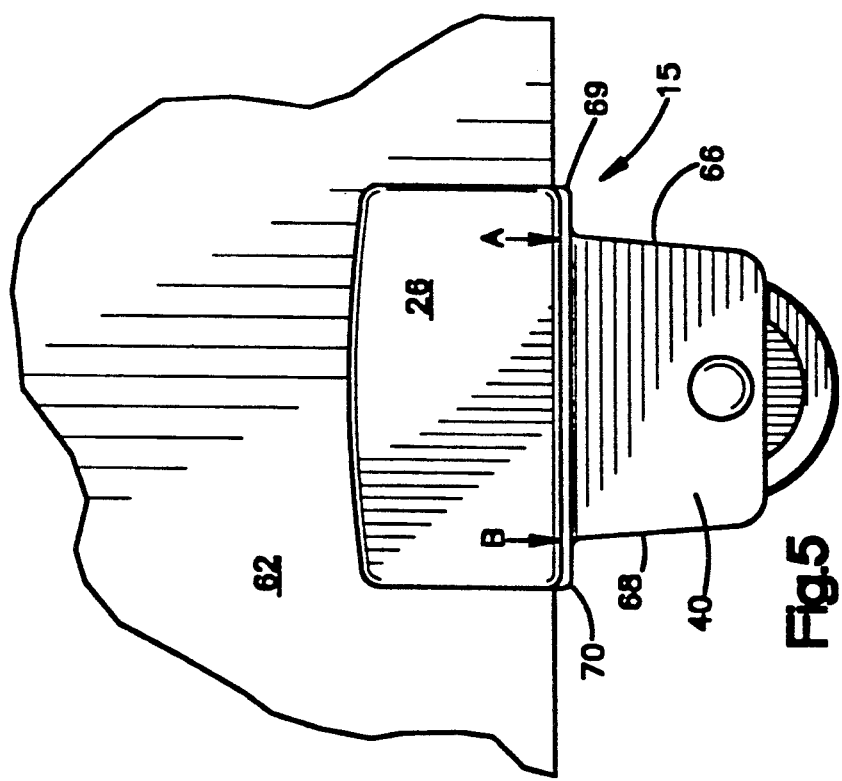

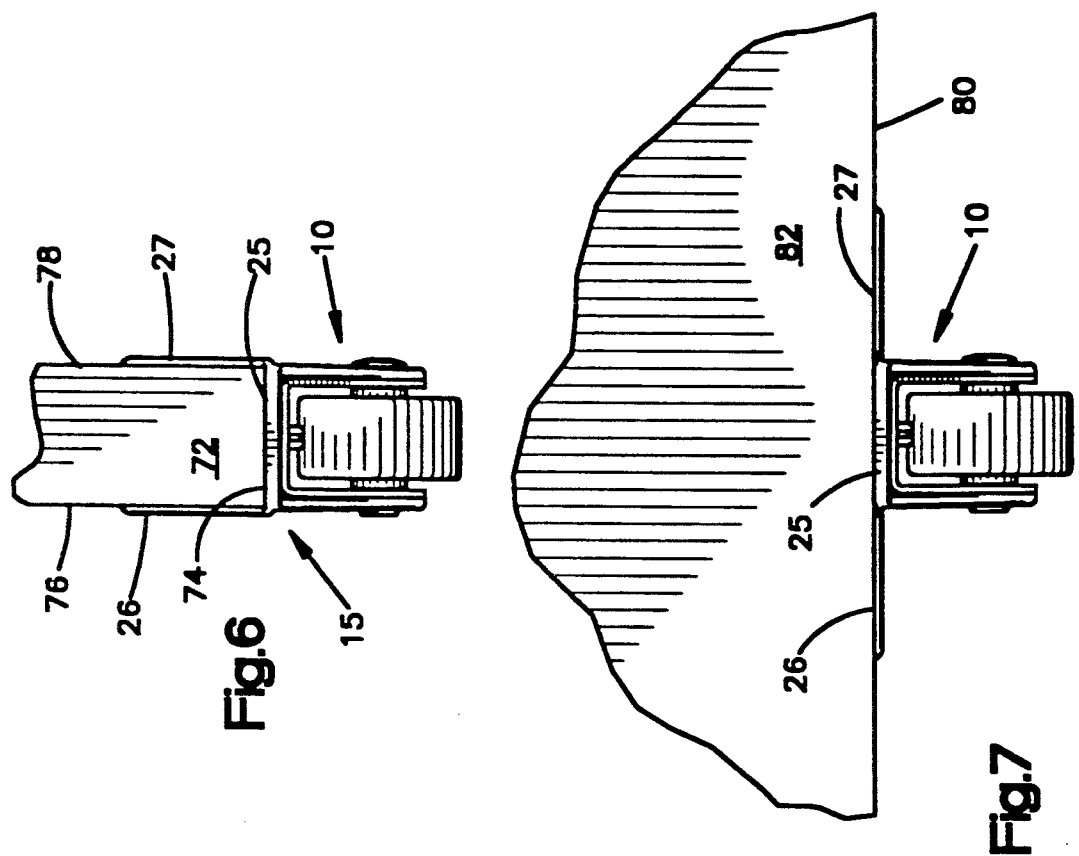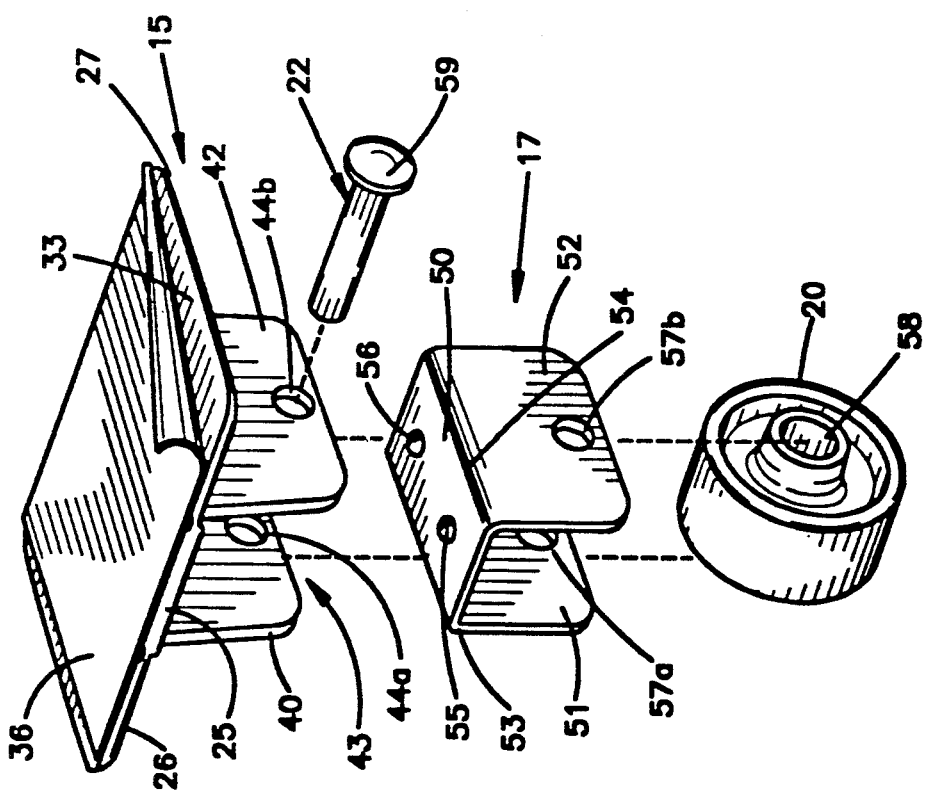

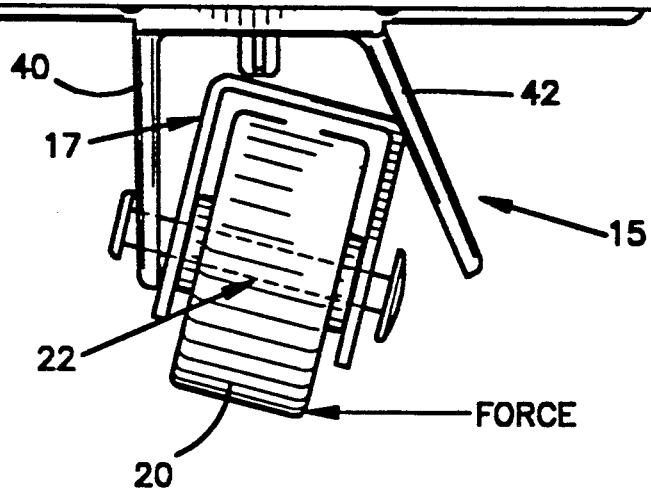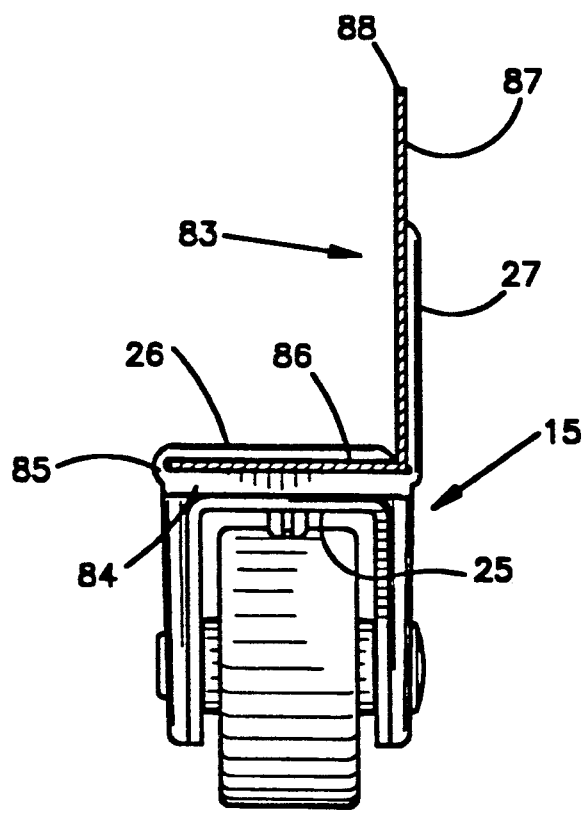

WHEEL ASSEMBLY

FIELD OF THE INVENTION

The present invention relates to a wheel assembly which is designed to be adhesively secured to an article.

BACKGROUND OF THE INVENTION

A caster wheel assembly provides support and mobility for furniture and other articles such as storage boxes, file cabinets, book shelves, etc. It is believed that a typical caster wheel assembly includes a mounting plate having a pair of downwardly extending legs which are designed to rotatably support a caster wheel on an axle. The mounting plate is attached to the bottom of the article by (1) inserting a pintle or stem projecting upwardly from the mounting plate into a socket structure formed in the bottom surface of the article; or (2) attaching the mounting plate adjacent the bottom of the article by inserting conventional fasteners (e.g., screws, bolts, nails) through apertures in the plate and then tightening the fasteners down against the bottom surface of the article.

For example, U.S. Pat. Nos. 4,068,342; 4,196,493; 4,262,871; and 4,129,921 illustrate caster wheel assemblies wherein a pintle or caster stem is received within a mounting socket formed in the bottom of the article. Additionally, U.S. Pat. Nos. 3,675,269 and 4,316,305 illustrate caster wheel assemblies wherein apertures formed in a mounting plate are designed to receive fasteners for coupling the plate adjacent the bottom surface of an article.

Although the above-noted caster wheel assemblies are useful for providing support and mobility for articles, the mounting plate must be secured to the article by e.g., drilling or forming a socket structure in the bottom surface of the article; or alternatively, forcing a fastener e.g., a screw, bolt or nail, into the bottom surface of the article. In other words, the integrity of the bottom surface of the article is compromised in order to attach the caster wheel assembly. Accordingly, the bottom surface of the article must have sufficient rigidity, density and depth to support the socket structure and/or fasteners. Further, if the socket structure for the pintle or stem becomes damaged, or the holes formed by the screws or bolts become thread-bare, it can become substantially more difficult to attach the caster wheel assembly to the article.

SUMMARY OF THE INVENTION

The present invention provides a wheel assembly designed to be adhesively secured to an article. The wheel assembly provides support and mobility for the article while maintaining the integrity of the bottom surface of the article. Moreover, the wheel assembly can be secured to a wide variety of articles without regard to the rigidity, density and depth of the bottom surface of the article.

The wheel assembly includes a mounting plate having an upper surface with an adhesive layer and a peel-away protective cover. The cover is designed to be removed to reveal the underlying adhesive layer. The mounting plate further includes a center portion and a pair of side portions which are pivotal relative to each other to enable the mounting plate to be adhesively attached to adjacent surfaces of the article.

A pair of legs are formed in one piece with the mounting plate and extend downwardly from the bottom surface of the plate. The pair of legs and the bottom surface of the mounting plate between the legs define a wheel channel. A relatively rigid insert is located within and conforms substantially to the wheel channel. The insert includes a base portion and a pair of legs extending downwardly from the base portion. The base portion includes alignment apertures which are designed to receive alignment fixtures formed on the bottom surface of the mounting plate to align the insert within the wheel channel.

Each of the legs has a front edge and a rear edge. The front and rear edges of the legs are offset inwardly from the front and rear edges of the mounting plate. The inward offset of the legs prevents the mounting plate from being separated from the article when the wheel assembly encounters a floor projection such as a door threshold.

A wheel is rotatably supported on an axle within the wheel channel between the legs of the insert. The contacting surface of the wheel includes a slight radius to prevent the wheel from grabbing carpet or uneven floorboards when the wheel assembly is moved laterally.

One feature of the present invention is to provide a wheel assembly which can be adhesively attached to an article to provide support and mobility for the article.

Another feature of the present invention is to provide a wheel assembly having a mounting plate with a center portion and side portions which are pivotal relative to each other to enable the mounting plate to be adhesively secured to adjacent surfaces of an article.

Still another feature of the invention is to provide a wheel assembly having a mounting plate with a pair of downwardly extending legs which are inwardly offset from the edges of the mounting plate. The inward offset of the legs prevents the mounting plate from being separated from an article when the wheel assembly encounters floor projections, such as a door threshold.

Still another feature of the present invention is to provide a multi-purpose wheel assembly which can be simply and easily manufactured using conventional injection molding techniques.

Yet another feature of the present invention is to provide a wheel assembly which can be adhesively secured to a wide variety of articles, such as cardboard storage boxes, wooden file cabinets, plastic trash cans, metal tool chests and composition board bookshelves.

Further features and advantages of the present invention will become apparent from the following detailed description and accompanying drawings which form a part of the specification.

BRIEF DESCRIPTION OF THE DRAWINGS

FIG. 1 is a perspective view of a wheel assembly constructed according to the principles of the present invention;

FIG. 2 is a perspective view of the bottom of the wheel assembly of FIG. 1;

FIG. 3 is an exploded view of a method for assembling the wheel assembly of FIG. 1;

FIG. 4 is a perspective view of the wheel assembly of FIG. 1 illustrating the assembly adhesively secured to adjacent surfaces of a corner of an article;

FIG. 5 is a side view of the wheel assembly of FIG. 4;

FIG. 5A is front view of the wheel assembly of FIG. 1, illustrating the break-away feature of the axle;

FIG. 6 is a front view of the wheel assembly of FIG. 1, illustrating the base portions of the wheel assembly adhesively secured to adjacent surfaces on adjacent corners of an article;

FIG. 7 is a front view of the wheel assembly of FIG. 1, illustrating the wheel assembly adhesively secured to a bottom, planar surface of an article; and FIG. 8 is a front view of the wheel assembly of FIG. 1, illustrating the wheel assembly adhesively secured to a flange of an article.

DESCRIPTION OF THE PREFERRED EMBODIMENT

Referring to the drawings, and initially to FIGS. 1, 2 and 3, a wheel assembly, indicated generally at 10, is designed to provide support and mobility for furniture or other articles such as cardboard storage boxes, wooden file cabinets, plastic trash cans, metal tool chests and composition board bookshelves. The wheel assembly 10 includes a mounting plate, indicated generally at 15, an insert, indicated generally at 17, and a wheel 20 rotatably mounted on axle 22.

The mounting plate 15 is preferably formed from flexible co-polymer polypropylene, or other appropriate material. The mounting plate is formed using conventional injection molding techniques which are known to those skilled in the art. The mounting plate 15 includes a center portion 25 and a pair of side portions 26, 27 formed in one piece along opposite sides of the center portion 25. The side portions 26 and 27 are pivotal about hinges 30, 31 respectively (FIG. 2) formed in mounting plate 15.

The mounting plate 15 has an upper surface 33 and a lower surface 34. The upper surface 33 has a layer of adhesive applied thereto. Preferably, the adhesive is Avery 1191 rubber adhesive and withstands a tension of about 22 lb./sq. in. The adhesive can be removed from the surface of an article using commercially available solvents such as lighter fluid, or by scraping the adhesive manually. A peel-away adhesive cover 36 is applied across the upper surface 33 of the mounting plate 15 and is adapted to be removed by a consumer to reveal the underlying adhesive layer.

The bottom surface 34 of the mounting plate 15 includes a pair of legs 40, 42 formed in one piece and extending downwardly from the center portion 25. The legs 40, 42 and the bottom surface 34 of the mounting plate between the legs define a wheel channel, indicated generally at 43. The legs 40, 42 have a rectangular shape in side view, however other shapes are within the scope of this invention. Additionally, each leg 40, 42 has an aperture 44A, 44B, respectively, formed therein. The apertures 44A, 44B are designed to receive axle 22 and support axle 22 in a substantially horizontal orientation.

The bottom surface 34 of mounting plate 15 further includes a pair of alignment structures, one of which is indicated at 46. The alignment structures 46 comprise downwardly projecting embossed members which facilitate aligning insert 17 within the wheel channel 43, as will be described herein in more detail.

The insert 17 is formed from a relatively rigid strip of appropriate material, for example steel, and includes a base portion 50 and a pair of legs 51, 52. The legs 51, 52 are formed in one piece with base 50 and are bent downwardly along corners 53, 54, respectively. The base 50 of the insert 17 includes a pair of alignment apertures 55, 56, which are designed to receive the alignment structures 46 formed with the bottom surface 34 of the mounting plate 15 to align the insert 17 within the wheel channel 43. A pair of apertures 57A, 57B (FIG. 3) are formed opposite each other in legs 51, 52 respectively. The apertures 57A, 57B are designed to receive axle 22 and support axle 22 in a substantially horizontal orientation.

The configuration of the insert 17 is substantially similar to the inner configuration of the wheel channel 43. Accordingly, when the insert 17 is located within the wheel channel 43 (see e.g., FIGS. 1, 2), the insert 17 fits smoothly and closely within the channel. Moreover, when located within the wheel channel 43, the apertures 57A, 57B in insert 17 are oriented with apertures 44A, 44B in legs 40, 42 of mounting plate 15.

The wheel 20 is designed to be assembled with mounting plate 15 and insert 17. The wheel 20 is preferably a conventional high-impact caster wheel available from Shepherd Caster, Model No. 007114. The wheel 20 has a crowned contacting surface wherein the diameter of the wheel is greater at the center of the wheel than at the edges. The crowned surface tends to prevent the wheel from grabbing when moved laterally across carpeting or uneven floors perpendicular to its normal direction of rotation. The wheel 20 includes a centrally-formed aperture 58 which is designed to receive axle 22 and allow rotation of the wheel.

The axle 22 for wheel 20 is preferably formed from a solid pin of appropriate material, and when assembled with the wheel assembly, has a weight rating of up to 1200 lbs. The axle 22 has a head 59 formed in one end, and a flange 60 (see e.g., FIG. 4) formed in the other end to couple the axle 22 between the legs 40, 42 of the mounting plate 15.

Initially in the assembly process, the insert 17 is located within the wheel channel 43 formed by legs 40, 42 and the lower surface 34 of the center structure 25. The alignment apertures 55, 56 in insert 17 are aligned with and receive the alignment structures 46 formed in the lower surface 34 of the mounting plate 15. When located in this manner, the apertures 57a, 57b in the insert 17 are aligned with apertures 44a, 44b in the legs 40, 42 of mounting plate 15.

The wheel 20 is then supported within the channel formed by legs 52, 54 of insert 17. Axle 22 is initially inserted through aperture 44B of leg 42 in the mounting plate 15, and through aperture 57B of leg 52 in the insert 17. The axle 22 is then inserted in the central aperture 58 in the wheel 20 and through aperture 57A of leg 51 in the insert 17, and through aperture 44A of leg 40 in the mounting plate 15. Alternatively, axle 22 can be inserted through aperture 44A of leg 40, through aperture 57A of leg 52, through central aperture 58 in wheel 20, through aperture 57B of leg 52, and then through aperture 44B of leg 52. In any case, the flange 60 is then formed on the end of axle 22 to couple the axle between the legs 40, 42 of the mounting plate 15 and support wheel 20 within the wheel channel 43.

The completed wheel assembly is designed to be adhesively secured to an article by initially removing the peel-away cover 36 to reveal the underlying adhesive layer on the upper surface 33 of the mounting plate 15. As illustrated in FIG. 4, the mounting plate 15 is initially aligned with adjacent surfaces of a corner of an article 62. In particular, the center portion 25 and side portion 27 are located adjacent a bottom surface 63 of the article 62; while side portion 26 is bent at hinge 30 and located adjacent the side surface 64 of article 62. With a minimum amount of pressure against the mounting plate 15, the mounting plate is adhesively secured to the adjacent surfaces 63, 64 of article 62.

As shown in FIG. 5, the legs of the mounting plate have a forward edge 66 and a rearward edge 68, for example as shown on leg 40. Similarly, the center portion 25 of the mounting plate 15 has a forward edge 69 and a rearward edge 70. The forward edges 66 of legs 40, 42 are offset inwardly approximately ¼ from the forward edge 69 of the center portion 25. Similarly, the rearward edges 68 of legs 40, 42 are offset inwardly approximately ¼ from the rearward edge 70 of the center portion 25. This inward offset of the forward and rearward edges of the legs increases the adhesive attachment of the wheel assembly 10 with the article 62.

In particular, in the event that the wheel assembly 10 is struck head-on by a floor projection such as a door threshold during movement of the article, a separating force is applied to the mounting plate 15. Specifically, the force is applied at points A or B, depending on which side of the mounting assembly is engaged; rather than at the forward edge 69 or rearward edge 70 of the center portion 25, which would occur if the edges 66, 68 of legs 40, 42 were flush with the edges 69, 70 of the center portion. A greater force is required to separate the mounting plate from its adhesive attachment with the article 62 when the legs are inwardly offset then if the legs are not offset. This requirement of greater force is believed to be due to the fact the separating forces will be applied to the adhesively attached surfaces in a "tension" manner. "Tension" in this context corresponds to forces which are applied in a direction perpendicular to the surface and equi-distant from the relevant moment of inertia. In contrast, if the force was applied in a "momentcreating" manner, (whereby one surface would be peeled from the other) less force would be required to separate the surfaces. Accordingly, the inward offset prevents the mounting plate from being separated from the article when the wheel assembly encounters a floor projection.

Moreover, in the event that the wheel 20 is engaged or struck laterally, such as if the wheel assembly is moved laterally across a carpet or uneven floor perpendicular to the normal direction of rotation, the legs 40, 42 are designed with a break-away feature. In particular, as shown in FIG. 5A, if sufficient force is applied laterally against wheel 20, the axle 22 is designed to rip or tear through the bottom of at least one of the legs 40, 42 of the mounting plate 15. The axle 22 is designed to separate from the legs before the mounting plate 15 is separated from the article 62, or before the legs 40, 42 are torn from the bottom surface 34 of the mounting plate 15. Accordingly, the break-away feature preserves the integrity of the mounting plate and legs, and allows the axle to be at least temporarily reinstalled in the ripped axle aperture for support of the article.

The wheel assembly 10 can also be attached to other surfaces of an article to provide support and mobility. For example, as illustrated in FIG. 6, the wheel assembly 10 can be adhesively secured to a downwardly extending leg 72 of an article. To this end, the center portion 25 of the mounting plate 15 is located adjacent the bottom surface 74 of the leg 72; while side portion 26 is located adjacent one side surface 76 of the leg 72 and side portion 27 is located adjacent the other side surface 78 of the leg 72. In this manner, the mounting plate 15 is adhesively secured to adjacent surfaces of adjacent corners of the article to provide support and mobility.

Further, referring now to FIG. 7, the wheel assembly 10 can also be attached to a planar bottom surface 80 of an article 82. According to this aspect of the invention, the central structure 25, as well as the side portions 26, 27, are located adjacent and adhesively secured to the bottom surface 80 of the article 82 to provide support and mobility for the article.

Still further, referring to FIG. 8, the wheel assembly 10 can also be adhesively secured to a downwardly extending flange of an article, for example as indicated generally at 83. To this end, the center portion 25 of the mounting plate 15 is located adjacent the bottom surface 84 of the flange foot 85; while side portion 26 is wrapped around the end of the flange and located adjacent the top surface 86 of the flange foot 85. Additionally, the side portion 27 is located adjacent the outer side surface 87 of the flange leg 88. In this manner, the mounting plate 15 is adhesively secured to the article to provide support and mobility.

Additionally, conventional attachment apertures, for example as indicated at 89 in FIG. 2, can be formed in the mounting plate 15, and preferably proximate the edges of the center portion 25. The attachment apertures 89 allow conventional fasteners, e.g. screws, nails, etc. to be inserted therethrough and drawn down against the surface of an article to provide additional integrity in the attachment of the wheel assembly to the article.

Accordingly, the wheel assembly described above is designed to be adhesively attached to an article to provide support and mobility. In particular, the wheel assembly can be attached to adjacent surfaces of a corner of the article; to adjacent surfaces of adjacent corners of the article; to a planar surface of the article; and to a flange. In any case, the wheel assembly can be attached to a wide variety of articles without compromising the integrity of the bottom surface of the article; and without regard to the rigidity, density and/or depth of the article.

Although the invention has been shown and described with respect to a certain preferred embodiment, it is obvious that equivalent alterations and modifications will occur to others skilled in the art upon their reading and understanding of the specification. The present invention includes all such equivalent alterations and modifications, and is limited only by the scope of the following claims.

We claim:

1. A wheel support assembly for an article, comprising:
 a mounting plate including a center portion and at least one side portion which is pivotal relative to said center portion to enable said mounting plate to be disposed against adjacent surfaces of the article, said mounting plate having an adhesive forming structure adapted to be adhesively secured to at least one of the surfaces of the article, and
 a wheel rotatably attached to said mounting plate.

2. A wheel support assembly for an article as in claim 1, wherein said mounting plate includes at least two side portions pivotal relative to each other and to said center portion.

3. A wheel support assembly for an article as in claim 2, wherein said side portions are pivotally attached along opposite sides of said center portion.

4. A wheel support assembly for an article as in claim 3, wherein said side portions are pivotal relative to said center portion from a substantially coplanar orientation to an overlying orientation.

5. A wheel support assembly for an article as in claim 1, wherein said adhesive forming structure comprises a layer of adhesive on an upper surface of said mounting plate, and a peel away cover designed to be removed to reveal the underlying adhesive layer.

6. A wheel support assembly for an article as in claim 1, wherein said mounting plate includes a pair of legs extending away from a lower surface of said plate, and said wheel is rotatably attached to said legs.

7. A wheel support assembly for an article as in claim 6, wherein said wheel is rotatably supported on an axle supported between said legs.

8. A wheel support assembly for an article as in claim 7, further including an insert located between and conforming substantially to said legs, said wheel being at least partially received within said insert.

9. A wheel support assembly for an article as in claim 1, wherein said mounting plate is formed by injection molding techniques.

10. A wheel support assembly for an article as in claim 1, wherein said mounting plate further includes attachment apertures to enable said mounting plate to be attached against adjacent surfaces of the article.

11. A wheel support assembly, comprising:
a mounting device having a base portion with first and second surfaces, said first surface having an adhesive layer with a peel away cover to enable said base portion to be selectively attached to a surface of an article,
a pair of legs formed in one piece with said base portion and extending away from said second surface of said base portion, said pair of legs and said second surface of said base portion between said legs defining a wheel channel,
a relatively rigid insert located within and conforming substantially to said wheel channel, and
a wheel at least partially located within said wheel channel and rotatably supported by said legs of said base portion.

12. A wheel support assembly as in claim 11, wherein said insert includes a base portion and a pair of legs extending outwardly from said base portion.

13. A wheel support assembly as in claim 12, wherein said legs of said insert are formed in one piece with said base portion.

14. A wheel support assembly as in claim 13, wherein said insert is formed from metal.

15. A wheel support assembly as in claim 14, wherein said wheel is rotatably supported on an axle.

16. A wheel support assembly as in claim 15, wherein said legs of said insert include apertures formed therein, said apertures designed to rotatably support said axle.

17. A wheel support assembly as in claim 16, wherein said legs of said base portion also include apertures formed therein designed to rotatably support said axle.

18. A wheel support assembly as in claim 11, wherein said second surface of said mounting plate further includes attachment structure extending outwardly therefrom, and said insert includes attachment apertures, said attachment apertures in said insert designed to receive said attachment structure on said mounting plate to align said insert within said wheel channel.

19. A wheel support assembly for an article, comprising:
a mounting device comprising a base portion with front and rear edges, said base portion having an adhesive layer on one surface with a peel away cover to enable said base portion to be adhesively secured to at least one surface of the article,
a pair of legs formed integrally with said base portion and extending away from another surface of said base portion, and
each of said legs having a front edge and a rear edge, at least one of said front and rear edges of said legs being spaced inwardly from said front and rear edges of said base portion an amount sufficient to reduce a separating force being applied to the edges of said base portion and prevent separation of said base portion from said article, and
a wheel rotatably supported by said legs of said base portion.

20. A wheel support assembly for an article as in claim 19, wherein said wheel is rotatably supported in a predetermined orientation by an axle extending between said legs of said base portion, each of said legs including an aperture designed to receive said axle.

21. A wheel support assembly for an article as in claim 20, wherein at least one of said legs is designed to release said axle from an aperture when a predetermined external force is applied against said wheel, and said axle is adapted to be reinserted in the aperture to retain said wheel in said predetermined orientation when said predetermined external force is removed.

22. A wheel support assembly for an article as in claim 19, further including an insert located between said legs, said wheel being at least partially received within said insert.

23. An apparatus comprising a wheel assembly adapted to be attached to an article having a pair of adjacent surfaces, said wheel assembly including a mounting plate with a center portion and at least one side portion which is pivotal relative to said center portion, said mounting plate being adapted to be adhesively secured to at least one of the adjacent surfaces without the use of mechanical fasteners in a manner which resists separation of the wheel assembly from the article, said wheel assembly having a portion adapted to extend away from the article when the wheel assembly is adhe⎯⎯ ' secured to the article.

24. An apparatus comprising a wheel assembly as in claim 23, wherein said portion adapted to extend away from the article rotatably supports a wheel.

25. A wheel support assembly, comprising:
a mounting device having a base portion with first and second surfaces, said first surface having an adhesive forming structure to enable said base portion to be adhesively attached to a surface of an article,
a wheel structure attached to said base portion and having a portion extending away from said second surface,
said portion of said wheel structure extending away from said second surface adapted to rotatingly support a wheel axle in a predetermined orientation relative to said mounting device,
said wheel structure adapted to release said wheel axle when predetermined external forces are applied to said wheel axle,
said wheel structure adapted for reinsertion of said wheel axle to retain said wheel axle in said predetermined orientation when said external forces are removed.

26. A wheel support assembly as in claim 25, wherein said wheel structure includes a pair of legs extending away from said second surface, said legs and said second surface between said legs defining a wheel channel, said wheel axle being rotatably supported in said wheel channel between said legs.

27. A wheel support assembly as in claim 26, wherein said legs of said wheel structure are formed integrally with said base portion.

28. A wheel support assembly as in claim 27, wherein said wheel support assembly includes an insert at least partially received within and conforming substantially to said wheel channel.

29. A wheel support assembly as in claim 28, wherein said insert includes a base portion and a pair of legs extending outwardly from said base portion.

30. A wheel support assembly as in claim 29, wherein said legs of said insert are formed integrally with said base portion.

31. A wheel support assembly as in claim 30, wherein said insert is formed from metal.

32. A wheel support assembly as in claim 31, wherein said legs of said insert include apertures formed therein, said apertures of said insert designed to rotatably support said axle.

33. A wheel support assembly as in claim 32, wherein said legs of said wheel structure also include apertures formed therein designed to rotatably support said axle in said predetermined orientation and designed for reinsertion of said axle.

34. A wheel support assembly as in claim 25, wherein said wheel axle supports a wheel rotatable in a first direction, and said predetermined external forces are applied to said wheel axle in a direction substantially perpendicular to said first direction.

35. A wheel support assembly as in claim 34, wherein said wheel includes a crowned contacting surface.

36. A wheel support assembly as in claim 25, wherein said base portion includes apertures, said apertures adapted to receive fasteners to enable said base portion to be attached adjacent the surface of the article.

* * * * *